United States Patent

Hayashi

[11] Patent Number: 5,740,242
[45] Date of Patent: Apr. 14, 1998

[54] ECHO CANCELER

[75] Inventor: Kensuke Hayashi, Tokyo, Japan

[73] Assignee: NEC Corporation, Tokyo, Japan

[21] Appl. No.: 620,493

[22] Filed: Mar. 22, 1996

[30] Foreign Application Priority Data

Mar. 22, 1995 [JP] Japan ................................. 7-062345

[51] Int. Cl.$^6$ .......................... H04B 3/23; H04M 1/74
[52] U.S. Cl. ................................. 379/411; 370/292
[58] Field of Search ........................ 379/399, 406, 379/410, 411, 407, 387, 388, 390; 370/286, 292

[56] References Cited

U.S. PATENT DOCUMENTS

| | | | |
|---|---|---|---|
| 3,465,106 | 9/1969 | Nagata et al. | 379/406 |
| 3,535,473 | 10/1970 | Flanagan et al. | 379/410 |
| 3,735,055 | 5/1973 | Thomas | 379/410 |
| 3,860,768 | 1/1975 | Wehrmann | 379/410 |
| 4,007,341 | 2/1977 | Sourgens et al. | 379/411 |
| 4,021,623 | 5/1977 | Suyderhoud et al. | 379/411 |
| 4,491,701 | 1/1985 | Duttweiler et al. | 364/724.19 |
| 5,007,044 | 4/1991 | Miyoshi et al. | 370/291 |
| 5,050,160 | 9/1991 | Fuda | 370/292 |
| 5,381,474 | 1/1995 | Lahdemaki et al. | 379/410 |
| 5,400,399 | 3/1995 | Umemoto et al. | 379/388 |
| 5,428,604 | 6/1995 | Fuda | 370/290 |
| 5,590,121 | 12/1996 | Geigel et al. | 370/290 |

FOREIGN PATENT DOCUMENTS 63-294020  11/1988  Japan ..................... H04B 3/23

Primary Examiner—Thomas W. Brown
Attorney, Agent, or Firm—Scully, Scott, Murphy & Presser

[57] ABSTRACT

An echo canceler is disclosed having a voice detector. When the voice detector detects the absence of input signals, the echo canceler is trained. In the training mode, the echo canceler receives an impulse signal from an impulse generator, as input through a switching device. When the input of the echo canceler is the impulse signal, a switch is turned off, a signal on a receiving line is stored in a tap coefficient memory, and the impulse signal on a transmitting line is stored in a transmission signal memory. Using the signals stored in the two memories, a convolution operation is performed by a convolution arithmetic unit. The data of the tap coefficient memory directly before the end of training are used for the tap coefficients after the training period.

5 Claims, 4 Drawing Sheets

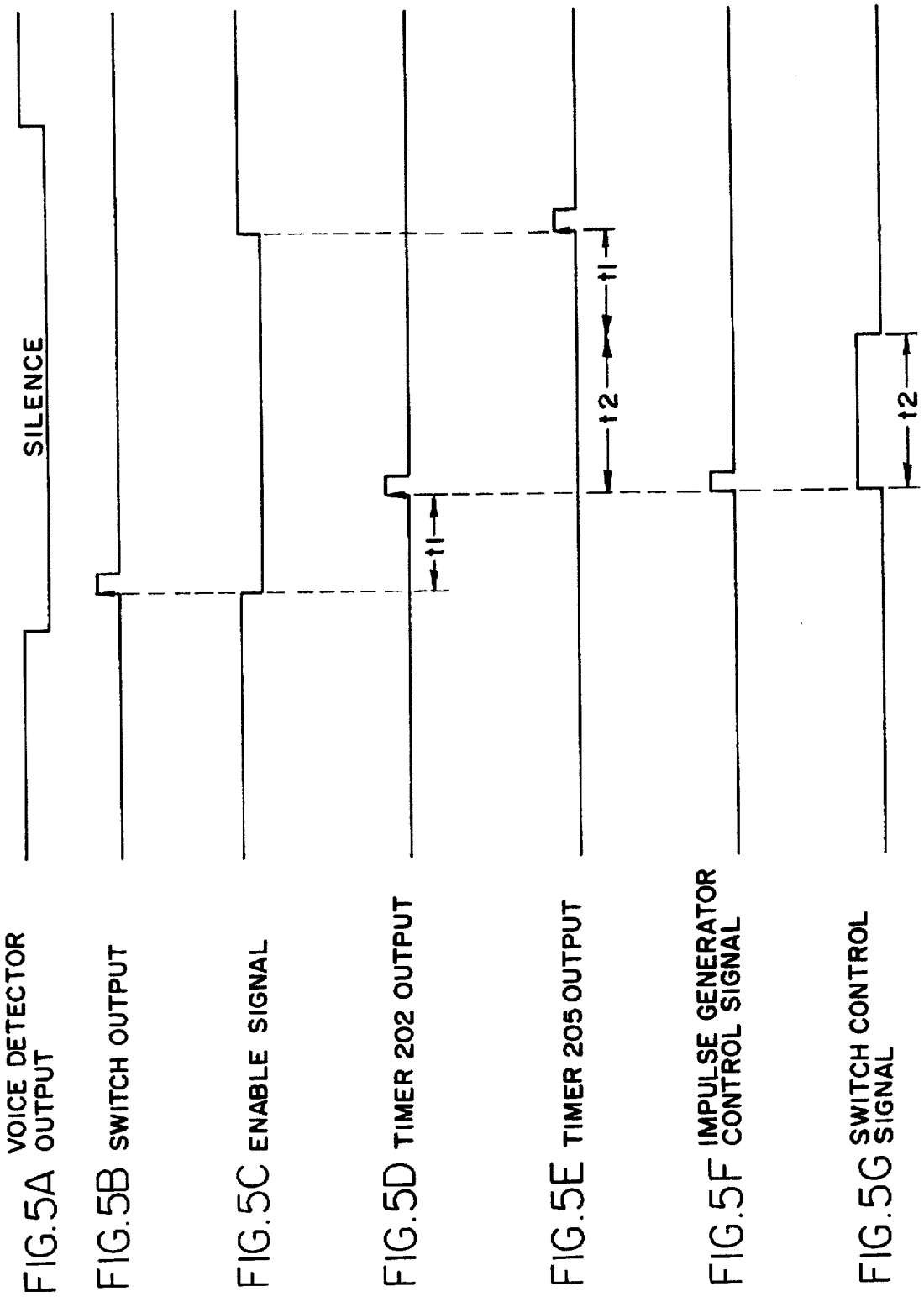

ECHO CANCELER

BACKGROUND OF THE INVENTION

The present invention relates to an echo canceler, more specifically to the improvement of the training of an echo canceler.

A hybrid circuit has been used for changing a two-wire circuit to a four-wire circuit. The hybrid circuit connects the transmitting line for sending transmission signals to the other responder electronically to the receiving line for receiving input signals from the other responder; therefore, it is unavoidable to leak an echo from the transmitter side to the receiver side, through the hybrid circuit.

To remove the echo, an echo canceler will be used; however, the conventional echo canceler indispensably needs a training for estimating echo paths.

One example of the conventional training system is constituted such that, after the lines are connected in a hybrid circuit, the tap coefficients of a FIR filter used in a echo canceler are set most suitably by transmitting white noises in a certain period of time. However, since the above-mentioned training system supplies white noises from the transmitter side during training, the white noises are transmitted through a hybrid circuit to the other responder (not illustrated in the drawing). Therefore, jarring noises are sent to the other responder, which is disadvantageous. Furthermore, when signals are transmitted from the other responder during training, there occurs an error in echo estimation for echo cancelling, resulting in being incapable of cancelling an echo.

To solve the problems of this type, another example of the training system has been disclosed in Japanese Patent Laid-open (Kookai) No. 63-294020. The system as described in this official gazette trains a FIR filter forming a echo canceler by using a training signal, which is similar to the first example mentioned above, and additionally it employs a melody signal for the training signal. It transmits to the other responder the melody signal instead of jarring noises to wipe out the discomfort of the other responder.

However, since the second training system replaces jarring impulsive noises with a melody signal, it needs an additional circuit for that replacement; involving a cost increase.

SUMMARY OF THE INVENTION

It is therefore an object of the present invention to provide a echo canceler for removing jarring noises generated by training signals during training and having a simple configuration.

Another object of the present invention is to provide a echo canceler for not producing any errors in an echo estimation by eliminating a possibility that the generation of training signals concurs with the reception of signals from the other responder.

The echo canceler of the present invention has a voice detector for detecting a silent state of input signals. Responding to detecting the silent state, an impulse generator feeds an impulse signal to a transmitting line. Responding to detecting the silent state, a switch circuit switches off the supply of detected echo components to a receiving line. When the impulse signal is supplied to the transmitting line, a filter executes the convolution operation between the impulse signal on the transmitting line and the signal on the receiving line.

In this constitution, the impulse signal is supplied to the transmitting line during the absence of the input signals to execute training. During the training interval, the echo canceler output is not supplied to the receiving line so that the convolution operation will be executed in this interval, between the echo signal on the receiving line and the impulse signal on the transmitting line so as to estimate an echo. Since the impulse signal is used instead of white noises, jarring noises will not be transmitted to the other responder. Since the training is executed during the absence of input signals, a correct echo estimation will be achieved without any effect by input signals.

BRIEF DESCRIPTION OF THE DRAWINGS

The above and other objects, features and advantages of the present invention will become apparent from the following detailed description when taken with the accompanying drawings in which:

FIGS. 5A–5G are time charts explaining the operation of the control circuit.

DETAILED DESCRIPTION OF THE PREFERRED EMBODIMENT

Figure 1:
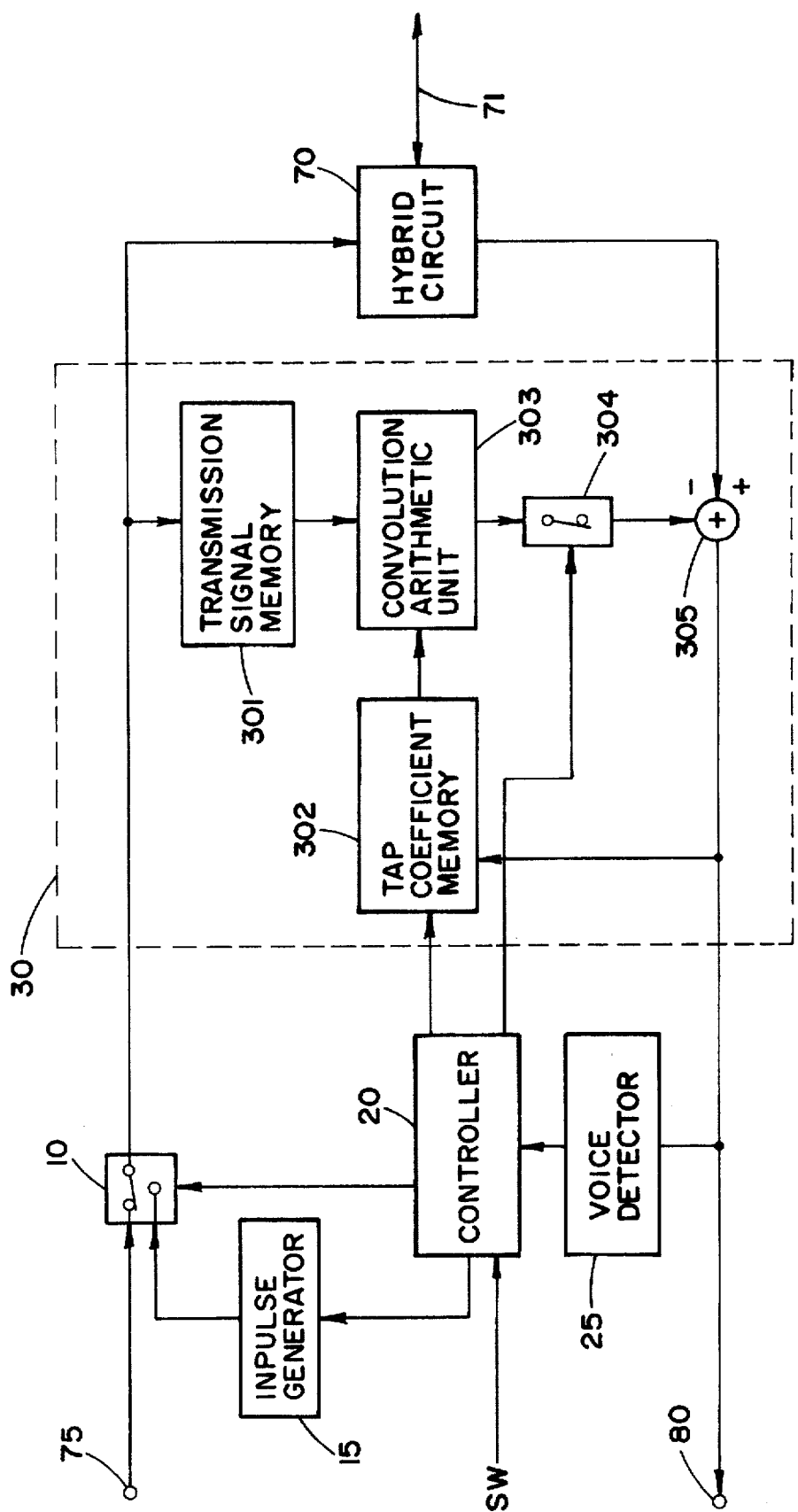
FIG. 1 is a block diagram showing an embodiment of the present invention.

FIG. 1 is a block diagram of the embodiment of the present invention. In FIG. 1, an input signal switching device 10 is installed on a transmitting line between a transmitter side 75 and an input of a echo canceler 30, which selects a transmission signal or an impulse signal from an impulse generator 15 and feeds a selected signal to the echo canceler 30. In a hybrid circuit 70, the transmitting line is electronically connected to a line 71 and a receiving line.

Input signals on the receiving line are guided to a receiver side 80 as well as to a voice detector 25 to detect a silent state. The voice detector 25 has a timer and a level detector, and determines a silent state when an input level in a pre-defined time is lower than a pre-defined level. The output detected by the voice detector 25 is supplied to a controller 20 to control the circuits for training.

The echo canceler 30 is comprised basically of a FIR adaptive digital filter. In this embodiment, it will be described by dividing it into functions such as a transmission signal memory 301, a tap coefficient memory 302, and a convolution arithmetic unit 303.

The transmission signal memory 301 stores signals on the transmitting line; it stores n-number samples of transmission signals, each of which is delayed by $0 \cdot T \sim (n-1) \cdot T$. Here, $0 \cdot T$ shows a sample at present, T shows one sampling period of the transmission signals. Therefore, each of the samples $0 \cdot T \sim (n-1) \cdot T$ stored in the memory 301 is equivalent to each of the tap signals of the digital filter.

The tap coefficient memory 302 stores the tap coefficients of the digital filter. As similar to the transmission signal memory 301, it stores n-number samples of input signals, each of which is delayed by $0 \cdot T \sim (n-1) \cdot T$. Except during a training interval, it latches the samples of the last training to be used for the tap coefficients thereafter.

The convolution arithmetic unit 303 executes a convolution operation between each of the samples of the transmission signal memory 301 and each of the samples of the tap coefficient memory 302. The operation results are used for estimated echo components, or detected echo components.

Provided that the data of the transmission signal memory 301, the data of the tap coefficient memory 302, and delayed sample numbers are expressed by x (k), h (k), and n, the output y of the convolution operator 303 will be:

$$y = \Sigma h(k) \cdot x(n-k) \quad (1)$$

where, $\Sigma$ indicates the summation in k=0~n−1.

A switch 304 is controlled to be off at the start of training, is controlled to be on at the end of training, and supplies the output y of the convolution arithmetic unit 303 to a subtracter 305; wherein, the input signals on the receiving line is subtracted by the output y, thus cancelling an echo.

The controller 20 controls the impulse generator 15, the input signal switching device 10, the tap coefficient memory 302, and the switch 304. When the channel becomes live after the line is connected, the controller 20 starts operation with the switch, not illustrated in the drawing, being pressed by a talker to provide a control input signal SW to the controller 20. When the voice detector 25 detects a silent state, the impulse generator 15 becomes active to generate an impulse signal for training, and the input signal switching device 10 selects the impulse signal to feed it to the echo canceler 30; wherein, the switch 304 is controlled to be off, and the echo canceler 30 will estimate an echo of the impulse signal.

Figure 2:
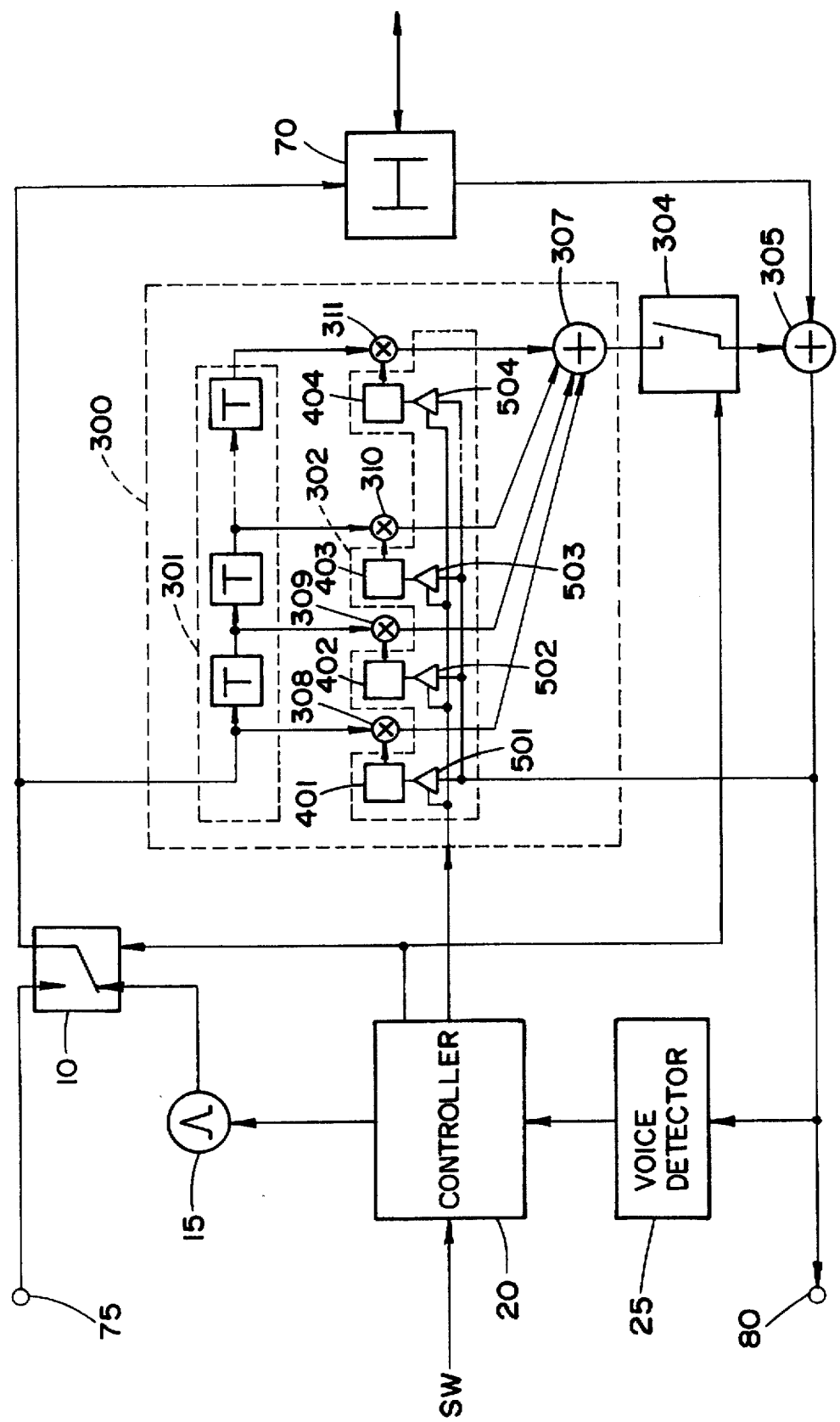
FIG. 2 is a circuit diagram showing a concrete example of FIG. 1.

FIG. 2 is a concrete example of the block diagram illustrated in FIG. 1, and it shows the echo canceler 30 in FIG. 1 by a FIR adaptive digital filter 300. The transmission signal memory 301 in FIG. 1 is a shift register with a cascade connection formed of (n−1) number delay elements, each of which has a delaying function by a unit delay T; and applying a signal on the transmitting line to the delay element of the first stage will produce delayed outputs each at each of the taps.

The tap coefficient memory 302 has latch elements 401–404 that sequentially take in the samples delayed by 0·T~(n−1)·T of the input signals; the intake of the samples is controlled by a state controller comprised of tri-state buffers 501–504.

The convolution arithmetic 303 comprises multipliers 308–311 corresponding to each tap and an adder 307. Each of the tap outputs from the shift register 301 is multiplied by each of the coefficients from the coefficient register 302, and each of the outputs multiplied is totally added by the adder 307; thus the convolution operation as expressed by the equation (1) will be performed.

After finishing training, the tap coefficients directly before the end of training are latched by each of the latch elements 401–404.

Figure 3:
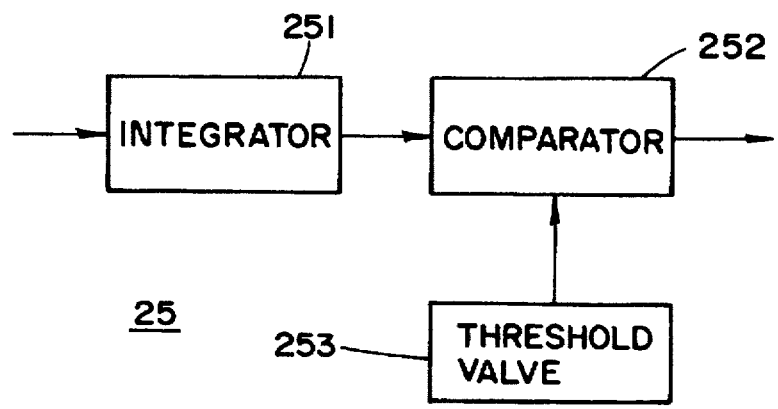
FIG. 3 is a block diagram showing an example of a voice detector.

Referring to FIG. 3, the voice detector 25 has an integrator 251 for integrating input signals. Signal levels having been integrated are compared by a comparator 252 to the reference level from a threshold value generating circuit 253. When an integrated level is lower than the reference level, the comparator 252 feeds a signal representing a silent state.

Figure 4:
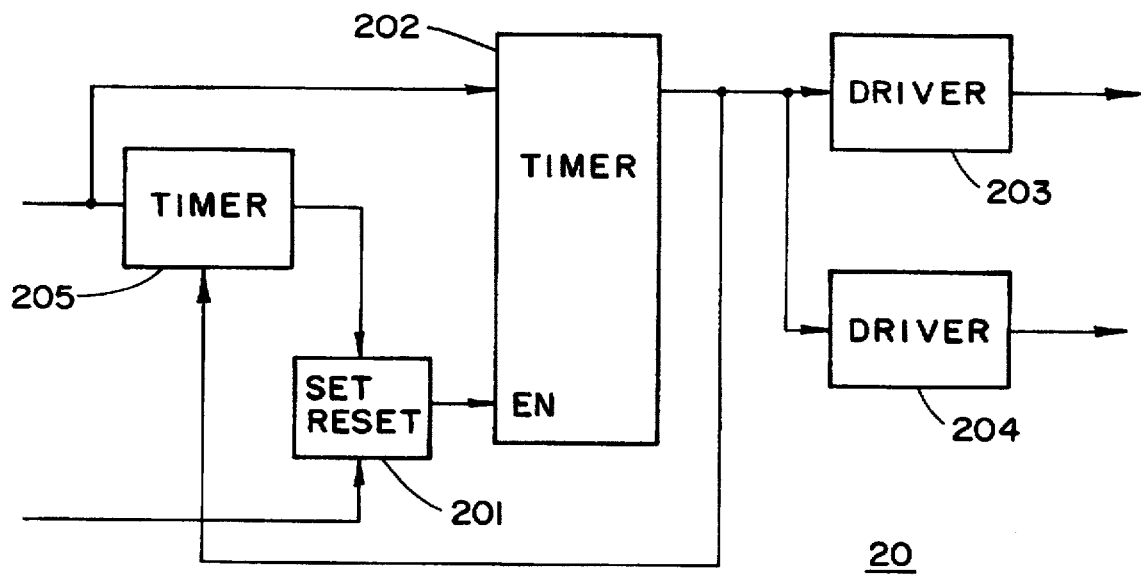
FIG. 4 is a block diagram showing an example of a control circuit.

FIG. 4 is a block diagram showing an example of the controller 20, and FIGS. 5A–5G are time charts explaining the operation of the controller. Referring to these figures, the controller 20 has a first timer 202 that becomes operable (FIG. 5C) by a set signal from a flip-flop 201 controlled by a switching signal (FIG. 5B) from an external switch not shown in the drawing. The timer 202 monitors the output of the voice detector 25 for t1 second, and when it detects a silent state for t1 second, it feeds a trigger signal (FIG. 5D). By the trigger signal, a driver 203 drives the impulse generator 15 (FIG. 5F), and supplies an impulse to the input signal switching device 10. At this moment, a driver 204 is also driven by the trigger signal, and supplies a switch control signal (FIG. 5G) for t2 second to the input signal switching device 10. Furthermore, the trigger signal is supplied also to a second timer 205. Responding to the trigger signal, the second timer 205 feeds a signal (FIG. 5E) to disable the first timer 202 when a silent state continues for (t1+t2) second. Therefore, after a training is executed for t2 second, and additionally after t1 second, the first timer 202 will stop the operation. When the first timer 202 does not detect a silent state for t1 second and the second timer 205 does not detect a silent state for (t1+t2) second, the controller 20 returns to a state ready to receive a control signal from the aforesaid external switch. It should be noted that the first time period of t1, which is before and after the second time period t2, is a guard time to secure the accurate training.

What is claimed is:

1. An echo canceler comprising:
   a voice detector for detecting a silent state of input signals;
   an impulse generator for supplying an impulse signal to a transmitting line during the silent state;
   a switch for switching off the supply of detected echo components to a receiving line during the silent state; and
   an operation means for executing a convolution operation between the impulse signal on the transmitting line and a response signal on the receiving line which is formed in response to the impulse signal.

2. An echo canceler as claimed in claim 1, wherein the operation means comprises:
   a transmission signal memory for storing the impulse signal on the transmitting line;
   an input signal memory for storing the response signal on the receiving line which is formed in response to the impulse signal;
   a convolution means for executing a convolution operation between contents of the transmission signal memory and contents of the input signal memory.

3. An echo canceler as claimed in claim 2, wherein the convolution means comprises a FIR digital filter, wherein the transmission signal memory comprises a shift register having a cascade connection formed of a plurality of delaying elements each having a unit delaying function corresponding to taps of the filter, and wherein the input signal memory comprises latch elements each latching the response signal on the receiving line.

4. An echo canceler as claimed in claim 3, wherein the convolution means comprises a multiplier for multiplying each of the tap outputs by each of the latch outputs of the latch elements, and an adder for adding all the outputs multiplied thereof.

5. An echo canceler as claimed in claim 4, wherein each of the latch elements responds to a release of the silent state, and latches to hold data of the response signal directly before the release of the silent state for use as the tap coefficients after the silent state.

* * * * *